US010710929B2

(12) United States Patent
Lorgouilloux et al.

(10) Patent No.: US 10,710,929 B2
(45) Date of Patent: *Jul. 14, 2020

(54) MINERAL COMPOSITION BASED ON A MIXED SOLID PHASE OF CALCIUM AND MAGNESIUM CARBONATES AND PROCESS FOR PREPARING SUCH A COMPOSITION

(71) Applicant: S.A. Lhoist Recherche et Developpement, Ottignites-Louvain-la-Neuve (BE)

(72) Inventors: Marion Lorgouilloux, Strepy-Bracquegnies (BE); Marc Pelletier, Saint-Mande (FR); Robert Sebastian Gartner, Buizingen (BE); Thierry Chopin, Uccle (BE)

(73) Assignee: S. A. Lhoist Recherche et Developpement, Ottignies-Louvain-la-Neuve (BE)

( * ) Notice: Subject to any disclaimer, the term of this patent is extended or adjusted under 35 U.S.C. 154(b) by 4 days.

This patent is subject to a terminal disclaimer.

(21) Appl. No.: 16/425,144

(22) Filed: May 29, 2019

(65) Prior Publication Data

US 2019/0359524 A1 Nov. 28, 2019

Related U.S. Application Data

(62) Division of application No. 14/897,304, filed as application No. PCT/EP2014/069625 on Sep. 15, 2014, now Pat. No. 10,351,474.

(30) Foreign Application Priority Data

Sep. 19, 2013 (BE) .................................. 2013/0617

(51) Int. Cl.
C04B 18/02 (2006.01)
C04B 28/02 (2006.01)
(Continued)

(52) U.S. Cl.
CPC ................ *C04B 18/02* (2013.01); *C01F 5/24* (2013.01); *C01F 11/181* (2013.01); *C04B 14/26* (2013.01);
(Continued)

(58) Field of Classification Search
CPC ..... C04B 14/26; C04B 28/02; C04B 20/1066; C04B 18/02; C04B 2111/28;
(Continued)

(56) References Cited

U.S. PATENT DOCUMENTS 5,230,734 A ‡ 7/1993 Kumasaka .............. C01F 11/18
106/464
5,979,461 A ‡ 11/1999 Bensalem ................. A24F 1/02
131/36
(Continued)

FOREIGN PATENT DOCUMENTS

DE 3245103 A1 ‡ 6/1984 .............. C01F 11/00
EP 526121 B1 ‡ 2/1992
(Continued)

OTHER PUBLICATIONS

International Search Report, WO 2015/039994, dated Nov. 13, 2014, 3 pages.‡

*Primary Examiner* — Shuangyi Abu Ali
(74) *Attorney, Agent, or Firm* — Whitaker Chalk Swindle & Schwartz PLLC; Charles D. Gunter, Jr.

(57) ABSTRACT

A mineral composition is shown which contains a mixed solid phase of synthetic calcium and magnesium carbonates, formed of a crystallized calcic portion and a plate-like crystallized magnesian portion. The crystals of the calcic portion and those of the magnesian portion are aggregated in the form of composite aggregates. These aggregates themselves are at least partly agglomerated in the form of agglomerates. The calcic portion has at least one carbonate
(Continued)

Figure 1:
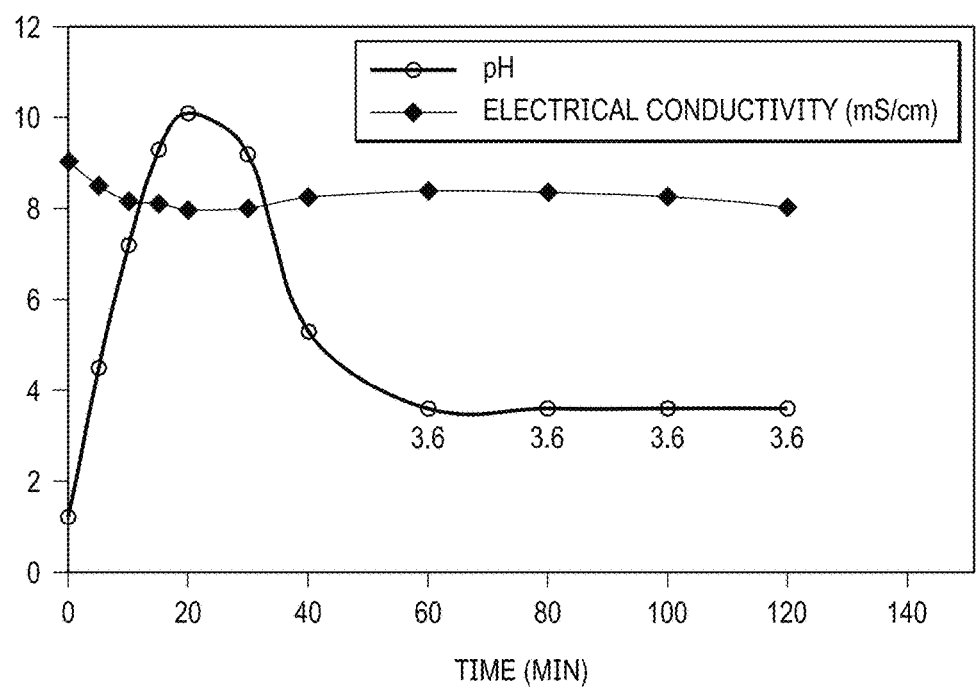

such as calcite or the mixtures of calcite and aragonite. The magnesian portion contains hydromagnesite in plate-like form. The aggregates are further formed of a calcic core on which hydromagnesite plates are aggregated. The mineral composition has defined thermal conductivity properties making it suitable for use as a building material.

4 Claims, 6 Drawing Sheets

(51) Int. Cl.
  *C04B 14/26*   (2006.01)
  *C01F 11/18*   (2006.01)
  *C01F 5/24*   (2006.01)
  *C04B 111/28*   (2006.01)
  *E04B 1/74*   (2006.01)

(52) U.S. Cl.
  CPC .......... *C04B 28/02* (2013.01); *C01P 2004/03* (2013.01); *C01P 2004/50* (2013.01); *C01P 2004/61* (2013.01); *C01P 2004/62* (2013.01); *C01P 2004/82* (2013.01); *C01P 2004/84* (2013.01); *C01P 2006/10* (2013.01); *C01P 2006/12* (2013.01); *C01P 2006/14* (2013.01); *C01P 2006/40* (2013.01); *C01P 2006/80* (2013.01); *C01P 2006/82* (2013.01); *C04B 2111/28* (2013.01); *E04B 2001/742* (2013.01)

(58) Field of Classification Search
  CPC ...... C01F 11/181; C01F 5/24; C01P 2004/03; C01P 2004/50; C01P 2004/61; C01P 2004/62; C01P 2004/82; C01P 2004/84; C01P 2006/10; C01P 2006/12; C01P 2006/14; C01P 2006/40; C01P 2006/80; C01P 2006/82; E04B 2001/742

See application file for complete search history.

(56) References Cited

U.S. PATENT DOCUMENTS

| | | | | |
|---|---|---|---|---|
| 10,351,775 B2 * | 7/2019 | Lorgouilloux | ............ | C01F 5/24 |
| 2008/0274034 A1 ‡ | 11/2008 | Sanchez-Valente | ..... | B01J 20/10 |
| | | | | 423/42 |
| 2010/0144521 A1 ‡ | 6/2010 | Constantz | ............ | B01J 20/043 |
| | | | | 502/40 |
| 2010/0239467 A1 ‡ | 9/2010 | Constantz | ................ | C01F 5/24 |
| | | | | 422/16 |
| 2012/0245253 A1 ‡ | 9/2012 | Schultz | ................... | C08K 3/26 |
| | | | | 523/43 |

FOREIGN PATENT DOCUMENTS

| | | | | |
|---|---|---|---|---|
| EP | 2322581 A1 ‡ | 5/2011 | ................ | C01F 5/24 |
| GB | 506134 ‡ | 5/1939 | | |
| JP | 5285999 A ‡ | 7/1977 | | |
| JP | 63123810 A ‡ | 5/1988 | | |
| JP | 05229819 A ‡ | 9/1993 | | |
| JP | H05229819 A ‡ | 9/1993 | | |
| JP | 2008156204 A ‡ | 7/2008 | ........... | C01F 11/181 |
| WO | WO-2013139957 A1 ‡ | 9/2013 | | |

\* cited by examiner
‡ imported from a related application

MINERAL COMPOSITION BASED ON A MIXED SOLID PHASE OF CALCIUM AND MAGNESIUM CARBONATES AND PROCESS FOR PREPARING SUCH A COMPOSITION

CROSS-REFERENCE TO RELATED APPLICATIONS

The present application is a divisional application of prior Ser. No. 14/897,304, filed Dec. 10, 2015, entitled "Mineral Composition Based On a Mixed Solid Phase of Calcium and Magnesium Carbonates and Process For Preparing Such a Composition", by the same inventors, now issued U.S. Pat. No. 10,351,474, which was the § 371 entry of International PCT/EP2014/069625, filed Sep. 15, 2014, which, in turn, claimed priority from Belgian application no. 2013/0617, filed Sep. 19, 2013.

FIELD OF THE INVENTION

The present invention relates to a mineral composition containing a mixed solid phase of calcium and magnesium carbonates, to a process for preparing such composition and the use thereof.

BACKGROUND OF THE INVENTION

Synthetic calcium carbonates are known chiefly for uses as fillers (paper, paint, plastics . . . ). For these applications it is particularly known to synthesize dense carbonates, calcite in particular having scalenohedral, rhombohedral or prismatic morphology or aragonite having acicular morphology.

Compositions containing synthetic calcium and magnesium carbonates are also known, used in particular in the field of paper manufacture and plastic materials.

For example compositions can be cited according to patent applications EP-A-2322581 and DE-A-3245103. The first discloses plate-like particles of magnesium carbonates in the form of hydromagnesite in a mixture with colloidal calcium carbonate, well-suited as fillers for paper or plastic materials. The second discloses scalenohedral particles of calcium carbonate (i.e. of rice grain shape) in a mixture with plate-like particles of basic magnesium carbonate. The respective carbonates do not form a composite.

The compositions described in European patent EP-B-0526121 are formed of a uniform mixture of particles of calcium carbonate having an acicular aragonite crystalline structure with columnar particle configuration and particles of slaked magnesium carbonate with plate-like particle configuration. These compositions are obtained by carbonatation of aqueous solutions of calcium and magnesium hydroxides using a complex process requiring the use of a variable $CO_2$ flow rate.

A Japanese patent application JP-63-123810 is also known which describes a process for producing a mineral composition containing a mixed solid phase of calcium and magnesium carbonates. This process comprises carbonatation of an aqueous suspension of basic magnesium carbonate to which is continuously added an aqueous suspension of magnesium hydroxide and calcium hydroxide. Carbonatation is conducted with fast $CO_2$ flow rate which gives rise to the formation of spherical, porous particles of basic magnesium carbonate on the seed nuclei of basic magnesium carbonate initially contained in suspension, the pores of these particles being partly filled with calcium carbonate. This composition is very dense and intended for the production of fillers for the manufacturing of paper, paints, plastic materials, or for the medical sector.

SUMMARY OF THE INVENTION

It is the objective of the present invention to develop mineral compositions particularly intended for the building industry. In this sector there is a need for example to develop mineral compositions able to offer an alternative of interest to polyurethane or phenolic foams usually used in heat insulation panels for example. Mineral materials have the advantage compared with organic foams of having a longer lifetime, distinctly improved flame resistance and reduced environmental impact. Whereupon it is desirable that these new mineral compositions should have thermal properties similar to those of known foam materials. There is therefore a need to develop mineral materials having high, controlled volume porosity and low density whilst maintaining acceptable mechanical properties (resistance to bending, to compression, to impacts . . . ).

In a porous medium, by thermal conductivity is meant a value $\lambda$ which is the sum of i) the ratio of the thermal conductivity of the gas contained in the pores to the volume fraction of the pores in the composition and of ii) the ratio of the thermal conductivity of the solid material to the volume fraction of this solid material in the composition. The thermal conductivity of gases is generally in the order of $10^{-2}$ W/K/m and that of solids in the order of 1 to $10^2$ W/K/m; the larger the volume fraction of gas (and hence of pores) in the composition the lower the thermal conductivity of the composition and the better the insulating property of the material.

A process to prepare a mineral composition containing a mixed solid phase of calcium and magnesium carbonates has already been provided, starting from crude dolomite that is calcined and then at least partly slaked (international patent application WO2013139957).

To solve the problem set forth above, there is provided according to the invention a process to prepare a mineral composition containing a mixed solid phase of calcium and magnesium carbonates, comprising:

i) preparing, in an aqueous phase, a solid phase containing at least one calcium compound selected from among calcium hydroxide ($Ca(OH)_2$), calcium carbonate and the mixtures thereof and at least one magnesium compound selected from among magnesium oxide (MgO), magnesium hydroxide ($Mg(OH)_2$), at least partly slaked dolomite and the mixtures thereof, the weight of said solid phase being between 5 and 15% of the total weight of the suspension;

ii) carbonatation of said solid phase in suspension by injecting a $CO_2$-containing gas into said suspension heated to a temperature of 55 to 90° C. at a $CO_2$ flow rate of 2.5 to 15 dm³/min/kg of said solid phase of the suspension, with decreasing of the pH of the suspension down to a value below 9 and stabilisation of the electrical conductivity of the suspension, carbonatation being halted as soon as this electrical conductivity stabilisation is observed; and iii) obtaining a mixed solid phase of synthetic calcium and magnesium carbonates formed of a crystallized calcic portion and a plate-like crystallized magnesian portion, the crystals of the calcic portion and those of the magnesian portion being aggregated in the form of composite aggregates, these aggregates themselves being at least partly agglomerated in the form of agglomerates, said calcic portion comprising at least one carbonate selected from the group formed by calcite, aragonite and the mixtures thereof, said magnesian portion comprising hydromagnesite in plate-like form, said mixed solid phase of carbonates of said mineral composition having a bulk density of 250 kg/m³ or lower and of 80 kg/m³ or higher measured as per standard EN 459.2.

The process of the invention has the advantage of being simple to implement and allows carbonatation to be performed in a single step.

DETAILED DESCRIPTION OF THE INVENTION

In the meaning of the present invention, by stabilisation of the electrical conductivity is meant a period longer than 15 minutes during which the electrical conductivity measured In the suspension does not vary by more than 0.5 mS/cm upwards or downwards, preferably a period of 30 minutes during which the electrical conductivity measured in the suspension does not vary by more than 0.5 mS/cm upwards or downwards, and advantageously a period of 30 minutes during which the electrical conductivity measured in the suspension does not vary by more than 0.3 mS/cm upwards or downwards. Depending on operating conditions this stabilisation phase may be of greater or lesser length. In some variants of the process it may last up to 60 minutes and even longer If said at least one calcic compound is in the form of calcium carbonate, it may advantageously be a calcium carbonate of filler type ($d_{98}$<150 µm, preferably $d_{98}$<50 µm), a finely ground calcium carbonate (Ground Calcium Carbonate—GCC) e.g. with $d_{98}$<50 µm, preferably $d_{98}$<20 µm) a synthetic calcium carbonate (Precipitated Calcium Carbonate—PCC) or a residue derived from incomplete calcining of limestone.

If said at least one calcic compound is in the form of calcium hydroxide, this hydroxide is obtained by slaking calcium oxide. According to one embodiment of the invention, this slaking is obtained with said aqueous phase during said preparation of a suspension. According to another embodiment of the invention, before said preparation of a suspension, the process comprises preliminary at least partial slaking of calcium oxide (CaO) to said calcium hydroxide. This preliminary slaking can dry slaking or near-dry slaking. It may also be wet slaking to produce a suspension. In particular a milk of lime, which is then optionally screened, milled and/or diluted for said preparing of the suspension.

This preliminary slaking is advantageously performed with water, water containing at least one additive or water already containing at least a portion of said at least one magnesium compound that is part of said solid phase in suspension.

The calcium oxide CaO used for this staking may be quicklime derived for example from calcining limestone, this calcining possibly having been incomplete, the lime then containing a fraction of calcium carbonate.

If said at least one magnesium compound is in the form of magnesium oxide, this magnesium oxide can be obtained using conventional MgO synthesis methods or from the calcining of a magnesium ore (e.g. dolomite or magnesite).

If said at least one magnesium compound is in the form of magnesium hydroxide this can be obtained using conventional synthesis methods of $Mg(OH)_2$ or advantageously by at least partial slaking of MgO. At least partly slaked dolomite has the general formula $aCa(OH)_2 \cdot xMg(OH)_2 \cdot yMgO$ where a, x and y are molar coefficients in particular with $0.8 \leq a/(x+y) \leq 1.2$. This dolomite can be obtained by at least partial slaking of dolomitic quicklime.

According to one preparation mode of the invention, this at least partial slaking of the magnesium compound is ensured, during said preparation of a suspension, by said aqueous phase.

According to another embodiment of the invention the process, before said preparation of a suspension, comprises prior at least partial slaking of the magnesium compound in particular magnesium oxide (MgO), to said magnesium hydroxide. This prior slaking can be dry slaking or near-dry slaking. Said prior slaking may also be wet staking to produce a milk of magnesia which is then optionally screened, milled and/or diluted for said preparing of the suspension.

Said prior slaking is advantageously performed with water, water containing at least one additive or water already containing at least a portion of said at least one calcic compound that is part of said solid phase in suspension.

Preferably the solid phase of the suspension has a Ca/Mg molar ratio of between 0.4 and 4.0. This molar ratio is advantageously higher than 1.2. In particular, it may also be 3.0 or lower, more particularly 2.5 or lower.

It is to be noted that in the process of the invention, there is no provision for the placing of solely dolomite in suspension, whether or not slaked.

Preferably, said at least one magnesium compound forming part of the solid phase of the suspension is selected from among magnesium oxide, magnesium hydroxide and the mixtures thereof. In this case the prepared suspension has a solid phase which does not contain any dolomite whether or not slaked.

Provision can also be made so that said at least one magnesium compound is at least partly slaked dolomite, optionally in a mixture with magnesium oxide, magnesium hydroxide or a mixture thereof, but so as to obtain a Ca/Mg molar ratio higher than 1.2 and of 4.0 or lower, in particular 3.0 of lower, optionally 2.5 or lower in said solid phase of the suspension.

Calcium carbonates generally have a smaller specific surface area than hydromagnesite and a higher bulk density. As a result over and above a certain Ca/Mg ratio, in particular beyond CaMg=4.0, the proportion of calcium carbonate in the product obtained with the process of the present invention becomes too high to allow the achieving of specific surface areas higher than 10 m²g and of bulk densities lower than 250 kg/m³.

Carbonatation of the solid phase in suspension is advantageously conducted at a temperature between 60 and 80° C., preferably 70° C. or lower, more particularly 65° C. or lower. Carbonatation at a lower temperature in particular at a temperature below 55° C., more particularly below 50° C., generally promotes the formation of a magnesium carbonate in nesquehonite form rather than hydromagnesite form. Therefore the mixed solid phase of carbonates of said mineral composition thus formed generally has a bulk density that is too high, in particular higher than 250 kg/dm³ even higher than 300 kg/dm³ together with thermal conductivity that is also too high.

At this carbonatation step it is preferably provided that the $CO_2$ should be injected pure at 100 volume % or diluted in a carrier gas, air in particular, at a $CO_2$ volume concentration in the carrier gas of 15 to 50%, in particular 15 to 25%. The total injection rate (carrier gas and $CO_2$) may advantageously be in the order of 15 to 55 dm³/min/kg of solid phase in suspension. The flow rate of $CO_2$ (excluding the carrier gas) is advantageously between 2.5 and 9.5 dm³/min/kg in particular between 5 and 9.5 dm³/min/kg of solid phase in suspension.

At this carbonatation step (step ii of the process of the present invention) the changes in the electrical conductivity of the suspension are dependent upon the choice of solid phase in the suspension.

If said calcic compound is in the form of calcium hydroxide or contains calcium hydroxide, the electrical conductivity starts to decrease rapidly and sharply translating precipitation of calcium carbonate. On the other hand, when said at least one calcic compound is exclusively in the form of calcium carbonate, it does not undergo any reaction during carbonatation and therefore has no influence on the electrical conductivity of the suspension.

Carbonatation of the magnesium compound is accompanied by an increase in the electrically conductivity of the suspension initially on account of the formation of magnesium bicarbonate ions. In parallel with this dissolution the precipitation of the bicarbonate ions to hydromagnesite takes place which, at a second stage, leads either to a decrease in electrical conductivity or at least to stabilisation thereof. This increase followed by decrease or stabilisation related to carbonatation of the magnesium compound occurs right at the start of the carbonatation step when the calcic compound is in calcium carbonate form, or after precipitation of the calcium carbonate when said calcic compound is initially in the form of calcium hydroxide.

At all events, the pH of the suspension (initially close to 9 when the calcic compound is in the form of calcium carbonate and between 12 and 13 when the calcic compound is in calcium hydroxide form) decreases throughout the carbonatation reaction of the solid phase in suspension to reach values lower than 9, in particular lower than 8.5 and more particularly lower than 8.3. Even if this pH is reached, the reaction is only halted however when the afore-described stabilisation step of electrical conductivity is observed.

During placing in suspension and carbonatation the suspension may advantageously be held under agitation e.g. at a speed of 350 to 650 rpm.

According to one embodiment of the invention, after carbonatation the process further comprises a solid-liquid separation step between said carbonatated mixed solid phase and said aqueous phase of said suspension. Advantageously the mixed solid phase can then be at least partly dried.

The present invention also relates to a mineral composition containing a mixed solid phase of synthetic calcium and magnesium carbonates, which can be prepared using the process of the invention. This composition is formed of a crystallized calcic portion and a crystallized magnesium portion in plate-like form, the crystals of the calcic portion and those of the magnesium portion being aggregated in the form of composite aggregates, these aggregates themselves being at least partly agglomerated in the form of agglomerates, said calcic portion comprising at least one carbonate selected from the group formed by calcite, aragonite and the mixtures thereof, said magnesium portion comprising hydromagnesite in plate-like form, said mixed solid phase of carbonates of said mineral composition having a bulk density of 250 kg/m$^3$ or lower and 80 kg/m$^3$ or higher, measured as per standard EN 459.2, and a Ca/Mg molar ratio of between 0.4 and 4.0. Advantageously in this composition the mixed solid phase has a Ca/Mg molar ratio higher than 1.2. Advantageously the Ca/Mg molar ratio may be 3 or lower and in particular 2.5 or lower.

Preferably, the calcic portion of said mineral composition contains less than 30 weight %, more preferably less than 20 weight %, further preferably less than 10 weight % even less than 5 weight % of aragonite.

Advantageously the calcic portion of said mineral composition is essentially formed of calcite.

The composition of the present invention may further comprise an aqueous phase, said composition then being in the form of a suspension or paste. It may also be in solid form, in particular powder form and have a humidity level of between 0 and 4%, in particular between 0.1 and 4%, more preferably 3% of lower, further preferably 2% or lower by weight of water relative to the total weight of the composition.

According to one embodiment of the invention, said mixed solid phase is milled to obtain particles of size 2 mm or smaller.

Calcite and aragonite are two crystalline structures of calcium carbonate $CaCO_3$. Hydromagnesite also called basic magnesium carbonate has the formula $Mg_5(CO_3)_4(OH)_2 \cdot 4H_2O$ or $4MgCO_3 \cdot Mg(OH)_2 \cdot 4H_2O$. In X-ray diffraction databases (International Centre for Diffraction Data (ICDD) database), hydromagnesite corresponds to datasheets carrying references 00-025-0513 (monoclinic) and 01-070-1177 (orthorhombic). It should not be confused with magnesite, a magnesium carbonate of formula $MgCO_3$, or with nesquehonite a slaked magnesium carbonate of formula $MgCO_3 \cdot 3H_2O$ which are to be avoided according to the invention.

By the expression "bulk density" according to the invention is meant the ratio between the mass of the material and the apparent volume of all agglomerates or grains measured in accordance with standard EN 459.2.

The low bulk density of the composition obtained according to the invention results from a large porous volume i.e. a high incorporation of gas in the mixed solid phase which has several layers of porosity: within the crystal aggregates, within the agglomerates of aggregates and even between the agglomerates or grains.

By the expression "porous volume" according to the invention is meant a global porous volume corresponding to the different porosities described above and measured by mercury intrusion porosimetry.

It is generally acknowledged that the bulk density of a standard hydromagnesite is between 200 and 400 kg/m$^3$, Synthetic calcium carbonates have a bulk density usually between 250 and 600 kg/m$^3$.

Against every expectation, the composition of the invention containing a mixed solid phase of calcium carbonate and hydromagnesite has a bulk density lower than 250 kg/m$^3$ for a Ca/Mg molar ratio of between 0.4 and 4.

This result is all the more surprising as it allows reduced thermal conductivity values to be reached, for the mineral composition of the invention, in the order of 25 to 45 mW/K/m, in particular in the order of 35 to 40 mW/K/m.

The mixed solid phase of the composition of the invention therefore has particular aspects that are not found in usual pure phases of hydromagnesite or synthetic calcium carbonate type.

The explanation would appear to lie in the fact that the mixed solid phase of calcium and magnesium has a mixed crystalline structure which provides for a better compromise between porosity, extent of aggregation and organisation of crystals in relation to one another. This compromise results in low bulk density and therefore in low thermal conductivity. This effect can be obtained using the process of the invention which is particularly designed to reach the particular characteristics of low bulk density and hence low thermal conductivity of the solid phase of the composition according to the invention.

The mixed solid phase of the mineral composition according to the invention may have a specific surface area of 10 m$^2$/g or higher, more particularly higher than 12 m$^2$/g and preferably 15 m$^2$/g or higher and possibly reaching 25 m$^2$/g.

By the expression "specific surface area" used in the present invention is meant the specific surface area measured by nitrogen adsorption manometry and calculated using the Brunauer, Emmett and Teller model (BET method).

The mixed solid phase of the composition of the invention therefore has an unexpected advantage in that its specific surface area is larger than that of usual ground calcium carbonates (GCCs) or synthetic calcium carbonates which have a specific surface area in the order of 3 to 15 m$^2$/g, most often less than 10 m$^2$/g.

In the composition of the invention the hydromagnesite content is between 5 and 80 weight %, advantageously between 5 and 71 weight %, preferably between 15 and 50 weight % and more preferably between 25 and 35 weight % relative to the weight of said mixed solid phase.

Advantageously said calcic portion is contained in the composition of the invention in an amount ranging from 20 to 85%, advantageously 29 to 85%, preferably 50 to 75 weight % in particular 60 to 70 weight % relative to the total weight of said mixed solid phase. The total magnesium portion represents an amount ranging from 5 to 71%, advantageously 15 to 50%, preferably 20 to 40% and more preferably 25 to 35 weight % of the total weight of the mixed solid phase.

In a dry powder of a preferred composition of the invention the following components can be distinguished (in weight %):
calcium carbonate CaCO$_3$ (calcite and optionally traces of aragonite): 29-85%;
portlandite Ca(OH)$_2$: 0-2%:
hydromagnesite Mg$_5$(CO$_3$)$_4$(OH)$_2$.4H$_2$0: 5-71%
brucite Mg(OH)$_2$: 0-10%, preferably 0-7% more preferably 0-3%;
periclase MgO: 0-2%;
magnesium oxyhydroxide Mg$_3$O$_2$(OH)$_2$: 0-5%, preferably 0-2%.

Preferably, in the mineral composition of the invention, the bulk density of the mixed solid phase is 220 kg/m$^3$ or lower, more preferably 200 kg/m$^3$ or lower, even 180 kg/m$^3$ or lower.

In one advantageous composition of the present invention, the mixed solid phase of the mineral composition has thermal conductivity of between 25 and 45 mW/K/m, in particular between 28 and 40 mW/K/m.

According to one advantageous embodiment of the invention, the proportion of the mixed solid phase is in the range of 5 to 65 weight % relative to the total weight of the composition and a liquid medium is contained in a proportion in the range of 35 to 95 weight % relative to the total weight of the mineral composition.

According to one advantageous embodiment of the invention, the mixed solid phase is composed of agglomerates milled to particles of size 2 mm or smaller, preferably 1 mm or smaller, more preferably of 200 μm or smaller and in particular of 80 μm or smaller. Advantageously these agglomerates have a d$_{50}$ larger than 5 μm, advantageously larger than 7 μm and a d$_{95}$ larger than 10 μm, advantageously larger than 20 μm.

According to the invention, the aggregates of the mixed solid phase are formed of a calcic core on which hydromagnesite plates are aggregated.

The aggregates may have substantially spherical morphology.

The mean size of 80% of the volume of the aggregates may be in the order of 1 to 30 μm, preferably 3 to 20 μm and in particular 5 to 15 μm. The plate width of 80% of the volume of the hydromagnesite plates is in the order of 0.5 to 10 μm, preferably 0.5 to 5 μm.

The hydromagnesite plates are not aggregated at random. The aggregates of the invention generally have shape resembling a desert rose.

A dry powder having a preferred mineral composition of the invention could have the following characteristics:
bulk density: 100-250 kg/m$^3$
thermal conductivity: 25-45 mW/K/m
BET specific surface area: 10-35 m$^2$/g
<100 μm pore volume: 1-5 cm$^3$/g
humidity: 0-4%.

The composition of the invention may further comprise additives facilitating the preparation filtration, storage and/or grinding (de-agglomeration) of said composition, in particular to improve the stability of the suspensions of the invention.

Advantageously, the mixed solid phase can be milled or de-agglomerated to obtain particles of size 2 mm or smaller, preferably 1 mm or smaller, more preferably 200 μm or smaller and in particular 80 μm or smaller. The drying operation can be performed simultaneously with de-agglomeration or grinding.

The present invention also concerns the use in building materials of a mineral composition of the invention or of a composition obtained using the process of the invention.

This composition can particularly be contemplated as raw material for the preparation of thermal insulation materials, in particular thermal insulation panels in the form of mineral sheets or foams, or in mortars, renderings, concretes in particular as thermal insulating component.

One use of the composition of the invention that can be envisaged is also as filler in polymer materials, rubbers, paper, paints, cosmetic products, in particular as low density and/or high porosity mineral fillers. This composition can also be envisaged as viscosifying or rheological agent e.g. in mineral suspensions, glues, bitumen or asphalt. The use thereof can be envisaged for water or gas treatment or in the field of catalysis or as carrier for perfumes, flavourings, active ingredients to ensure gradual and/or delayed release into their medium of use;

Other details and particular aspects of the invention will become apparent from the description given below as non-limiting examples in which the percentages given are weight percentages when not specified.

Appended FIGS. 1, 5, 8 and 10 give the curves of pH and electrical conductivity changes throughout the carbonatation reaction in examples 1, 4, 6 and 7. FIGS. 2, 3, 4A, 4B, 6, 7, 9 and 11 are scanning electron microscope (SEM) images illustrating the crystalline structure of the compositions obtained in Examples 1 to 7.

In the examples, bulk density was measured in accordance with standard EN 459.2. When measuring thermal conductivity, which is dependent on the extent of packing of the sample, a second non-normalised density value is obtained which must be indicated to have knowledge of the measurement conditions of thermal conductivity.

Thermal conductivity was measured on bulk material following the teachings of standards ISO 8301 or NF EN 12664. More specifically, thermal conductivity such as indicated in the present invention was measured on the mixed solid phase of the mineral composition obtained according to the invention i.e. on a powder previously dried at 105° C. and having humidity lower than 4 weight %. If the composition of the invention was in the form of a suspension or paste, said powder was obtained by filtration, drying and grinding of this composition.

Measurement was carried out in a flow meter (Netzsch Heat Flow Meter HFM 463/3IE Lambda Series) on bulk powder placed in a mould of larger size than the flow meter. The preparation of the powder bed in the mould was such that the surface of the powder bed was as flat as possible and the density of the powder bed, on which thermal conductivity was to be measured, was equal to the bulk density previously measured on each powder following the method described in standard EN 459.2 to within 20%, if possible to within 15%. A single measurement was made at 20° C. with a 20° C. temperature difference between the two sides of the sample (i.e. 10° C. for one side and 30° C. for the other).

The specific surface area was measured using the BET method based on measurement of nitrogen adsorption manometry, and <100 µm pore volume was measured by mercury intrusion.

EXAMPLE 1

Carbonatation at 70° C. of a Suspension of Magnesium Hydroxide and Ground Calcium Carbonate with Ca/Mg (mol) in the Order of 0.5

A/ Raw Materials

The ground calcium carbonate and magnesium hydroxide were industrial products. According to chemical analysis by X-ray fluorescence spectrometry with additional thermogravimetric analysis, the magnesium hydroxide contained 95.0±0.5% $Mg(OH)_2$, <1.0% MgO, 2.5±0.5% $CaCO_3$, and impurities chiefly $SiO_2$, $Al_2O_3$ and $Fe_2O_3$. It was in the form of a suspension containing 53% solids and the remainder water. The ground calcium carbonate contained >95% $CaCO_3$ and impurities again chiefly $SiO_2$, $Al_2O_3$, $Fe_2O_3$. This calcium carbonate was a natural limestone which was simply industrially ground. Laser measurement of particle size distribution gave a $d_{98}$ value in the order of 12 µm (±2 µm).

B/ Preparation of the Suspension 4.9 of ground calcium carbonate and 5.8 kg of magnesium hydroxide (dry equivalent) were placed in suspension in about 80 $dm^3$ water (water provided by the suspension of $Mg(OH)_2$ completed with mains water) to obtain a mixed suspension. The weights of ground calcium carbonate and magnesium hydroxide were determined to obtain a Ca/Mg molar ratio in the order of 0.5. The dry extract (solid content) of this suspension was 10.7 weight %. This suspension was placed in a reactor of 100 $dm^3$ capacity equipped with a double jacket and provided with an agitation system and heating system. This reactor was also equipped with a pH probe, electrical conductivity probe and temperature probe. The suspension was kept under agitation and the temperature brought to 70° C.±2° C.

C/ Carbonatation

When the suspension reached the temperature of 70° C.±2° C., injection of $CO_2$ was initiated in the form of a gas composed of 15% by volume $CO_2$ and 85% by volume air. The $CO_2$ carrier gas was injected via a nozzle located at the bottom of the reactor. The gas flow rates in the suspension corresponded to 55 $dm^3$/min of $CO_2$ and 314 $dm^3$/min of air i.e. 5.1 $dm^3$/min $CO_2$ and 29.3 $dm^3$/min air per kg of solid in the starting suspension (ground calcium carbonate and magnesium hydroxide). Throughout carbonatation the electrical conductivity of the suspension and its pH were recorded. The pH of the suspension before carbonatation was 9.0. Throughout carbonatation the conversion of magnesium hydroxide to carbonate was accompanied by a) a reduction in pH and b) an increase up to a maximum followed by a decrease and then stabilisation of electrical conductivity (FIG. 1). The reaction was halted after a stabilisation time of 1 hour of electrical conductivity at 3.6 mS/cm. After this carbonatation, the pH of the suspension was only 8.0. The increase in electrical conductivity at the start of the carbonatation reaction indicates the formation of soluble magnesium bicarbonate. The following decrease corresponds to precipitation of the hydromagnesite.

D/ Post-Synthesis Treatments

After carbonatation, the distribution of particle size in suspension was measured by laser particle size measurement by placing a few drops of the suspension in methanol. The $d_{50}$ of this suspension was 11.6 µm and its $d_{95}$ 26.3 µm. The suspension was then filtered through a Büchner, placed in an oven at 105° C. to dry for 48 hours and the dried solid was milled to obtain a powder of particle size smaller than 2 mm and having humidity of less than 3%.

Figure 2:
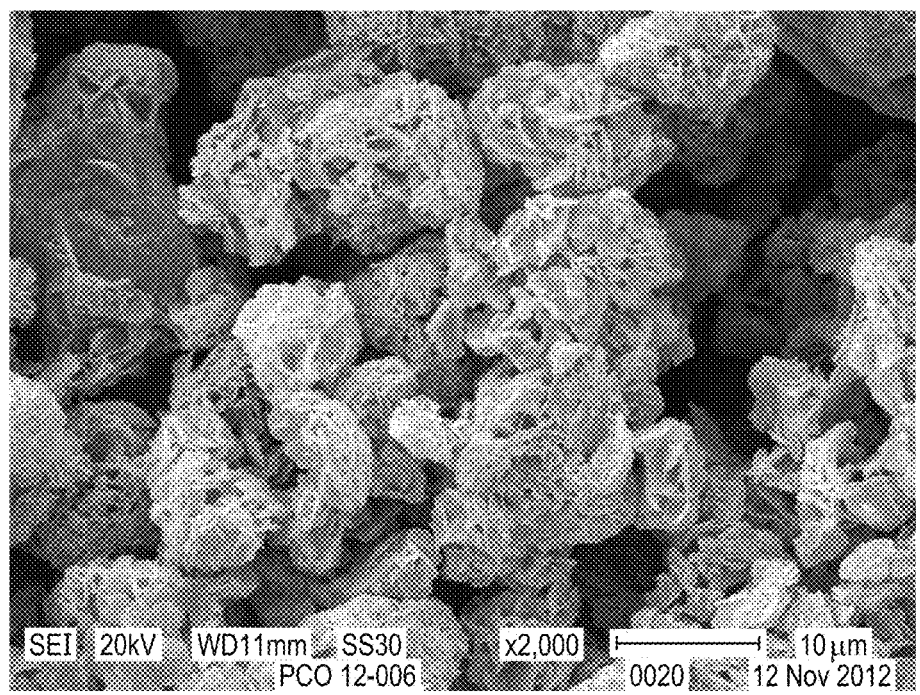

According to X-ray diffraction analysis with additional thermogravimetric analysis the product obtained contained 56±2% $CaCO_3$ (calcite), 40±2% hydromagnesite and 4±1% brucite $Mg(OH)_2$. Its bulk density measured according to standard EN 459.2 was 173 $kg/m^3$. The specific surface area was 16.5 $m^2$/g (BET method based on nitrogen adsorption manometry after degassing a few hours at 190° C.). Thermal conductivity was 37.2 mW/K/m for a density at the time of measurement of 185 $kg/m^3$. FIG. 2 is a scanning electron microscope image of the product obtained. This photograph shows that the (plate-like) hydromagnesite formed by carbonatation of the magnesium hydroxide has crystallized on the surface of the particles of ground calcium carbonate.

EXAMPLE 2

Carbonatation at 70° C. of a Suspension of Magnesium Hydroxide and Ground Calcium Carbonate with Ca/Mg (mol) in the Order of 0.9

This example is fully similar to Example 1, solely the weights of ground calcium carbonate and magnesium hydroxide are different.

This time 6.5 kg of ground calcium carbonate and 4.2 kg of magnesium hydroxide (dry equivalent) were placed in suspension in about 80 $dm^3$ water (water provided by the suspension of $Mg(OH)_2$ completed with mains water) to obtain a mixed suspension. The weights of ground calcium carbonate and magnesium hydroxide were determined to obtain a Ca/Mg molar ratio this time in the order of 0.9. The dry extract (solid content) of this suspension was 11.3%.

This suspension was placed in the same reactor as used in Example 1 and carbonatation was conducted under exactly similar conditions to those of the carbonatation described in Example 1. As described in Example 1, the electrical conductivity of the suspension increased right at the start of the carbonatation reaction, reached a maximum before showing a distinct decrease and then stabilising. Again the reaction was halted after stabilisation of the electrical conductivity of the suspension for 40 minutes at 4.0 mS/cm (±0.1 mS/cm). At this point the pH of the suspension initially of 9.1 dropped to 8.1.

After carbonatation, the particle size distribution in the suspension was again measured and showed a $d_{50}$ value of 12.4 µm and $d_{95}$ value of 30.1 µm. The suspension was then filtered, dried and the solid obtained was milled as in Example 1.

Figure 3:
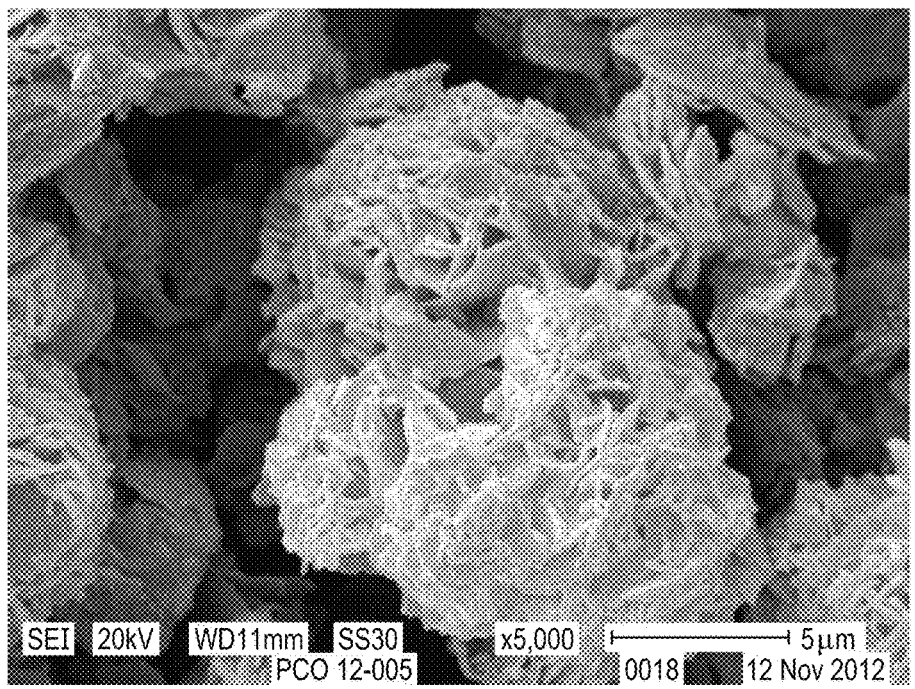

According to X-ray diffraction analysis with additional thermogravimetric analysis, the product obtained contained 70±2% $CaCO_3$ (calcite), 26±2% hydromagnesite and 4±1% brucite. It bulks density measured according to standard EN 459.2 was 211 kg/m³. The specific surface area was 12.3 m²/g. Thermal conductivity was 38.1 mW/K/m for a density at the time of measurement of 225 kg/m³. FIG. 3 illustrates the product obtained. This photograph, as in FIG. 2, shows that the hydromagnesite formed by carbonation of magnesium hydroxide has crystallized on the surface of the particles of ground calcium carbonate.

EXAMPLE 3

Carbonatation at 70° C. of a Suspension of Magnesium Hydroxide and Ground Calcium Carbonate with Ca/Mg (mol) in the Order of 1.6

This example is fully comparable with Examples 1 and 2. The weights of ground calcium carbonate and magnesium hydroxide were again different and the ground calcium carbonate was derived from another source this time with a $d_{98}$ in the order of 36 µm.

This time, 7.9 kg of ground calcium carbonate and 2.8 kg of magnesium hydroxide (dry equivalent) were placed in suspension in about 80 dm³ of water (water provided by the suspension of $Mg(OH)_2$ completed with mains water) to obtain a mixed suspension. The weights of ground calcium carbonate and magnesium hydroxide were determined this time to obtain a Ca/Mg molar ratio in the order of 1.6. The dry extract (solid content) of this suspension was 12.5%.

This suspension was placed in the same reactor as used in the preceding examples and carbonatation was performed under exactly similar conditions to those described in Examples 1 and 2. As previously, the electrical conductivity of the suspension increased right at the start of the carbonatation reaction, reached a maximum before distinctly decreasing and then stabilising. The reaction was halted when the electrical conductivity was stable at 3.4 mS/cm (±0.2 mS/cm) for 30 minutes. At this moment the pH of the suspension, initially 9.4, dropped to 8.3.

After carbonatation the distribution of particle size in suspension was again measured and gave a $d_{50}$ value of 9.3 µm and $d_{95}$ value of 22.7 µm. The suspension was then filtered, dried and the solid obtained was milled as in the above examples.

Figure 4A:
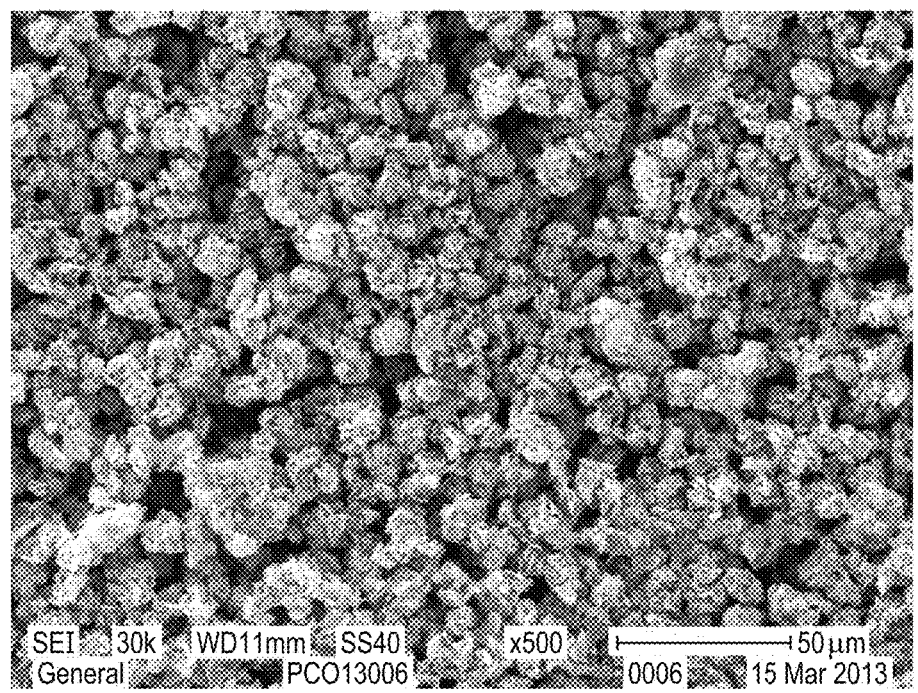
Figure 4B:
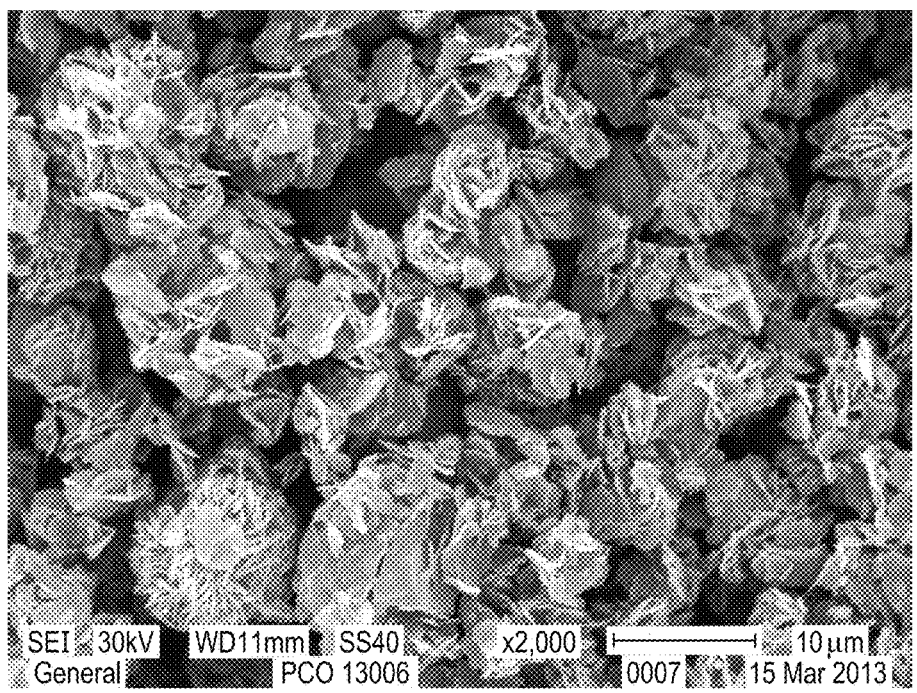
Figure 5:
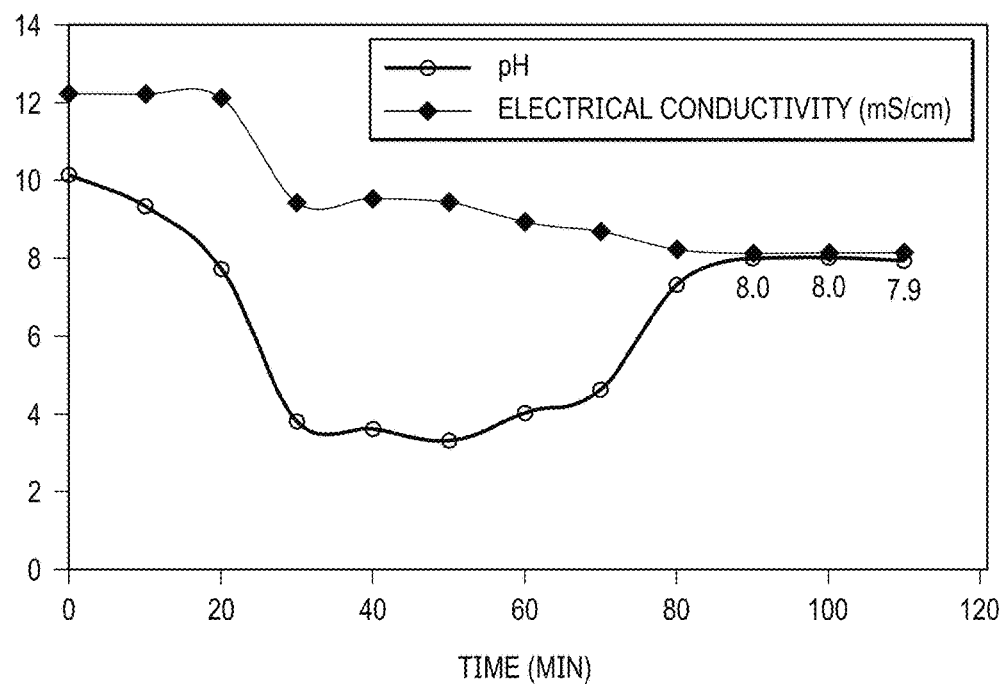

According to X-ray diffraction analysis with additional thermogravimetric analysis the product obtained contained 59±2% $CaCO_3$ (calcite), 37±2% hydromagnesite and about 4%±1% brucite $Mg(OH)_2$. Its bulk density measured according to standard EN 459.2 was 214 kg/m³. The specific surface area was 11.5 m²/g (BET method based on nitrogen adsorption manometry). Thermal conductivity was 37.6 mW/K/m for a density at the lime of measurement of 222 kg/m³. FIGS. 4A and 4B illustrate the product obtained. These photographs show that the product is homogeneous and that the hydromagnesite plates again cover the particles of ground calcium carbonate.

EXAMPLE 4

Carbonatation at 60° C. of a Suspension of Dolomite and Ground Calcium Carbonate with Ca/Mg (mol) in the Order of 1.5

This example was inspired from the preceding examples but this time the ground calcium carbonate was placed in suspension not with a suspension of $Mg(OH)_2$ but with a previously prepared suspension of at least partly slaked dolomite.

At a first step 5.8 kg of dolomitic quicklime of particle size 0-3 mm were placed in 23.0 kg of water heated to 55° C. This suspension was placed under agitation for 30 minutes, time during which the dolomite was at least partly slaked. After a slaking lime of 30 minutes, an additional 20.0 kg of water and 3.0 kg of ground calcium carbonate (same GCC as in Example 3) were added and agitation continued for 20 minutes. The weights of dolomite and ground calcium carbonate were determined to obtain a Ca/Mg ratio of 1.5. The suspension obtained was passed through a 200 µm screen to remove the coarsest particles (in particular unfired particles initially contained in the dolomitic quicklime). The screened suspension was then diluted to a dry extract (solid content) of 9.4% and 80 dm³ of this suspension were placed in the 100 dm³ reactor already used in all the preceding examples.

Carbonatation this time was conducted at 60° C. The $CO_2$ flow rate was 45 dm3/min and the air flow rate 180 dm³/min, i.e. a volume concentration of 20% $CO_2$ in the gas, i.e. also about 6.0 dm³/min $CO_2$ and 24.0 dm³/min air per kg of solid contained in the suspension before carbonatation.

Throughout carbonatation (FIG. 5), the electrical conductivity of the suspension started by decreasing and this decrease was accompanied by a drop in pH from 12.2 to 9.4. These results are proof of carbonatation of the calcic portion of the at least partly slaked dolomite to form a calcium carbonate (PCC) in situ in addition to the starting ground calcium carbonate (GCC). After some slowing of the reaction, the electrical conductivity again slowly increased before finally stabilising for 20 minutes at 8.0 mS/cm (±0.1 mS/cm). This second phase of the reaction was accompanied by a second drop in pH down to 8.1 and translated the competition between formation of hydromagnesite and dissolution of $Mg(OH)_2$ (and possibly of already-formed hydromagnesite) to bicarbonate ions of Mg.

After carbonatation, the distribution of particle size in suspension was again measured and gave a $d_{50}$ value of 8.8 µm. The suspension was then filtered, dried and the solid obtained was milled as in the above examples.

Figure 6:
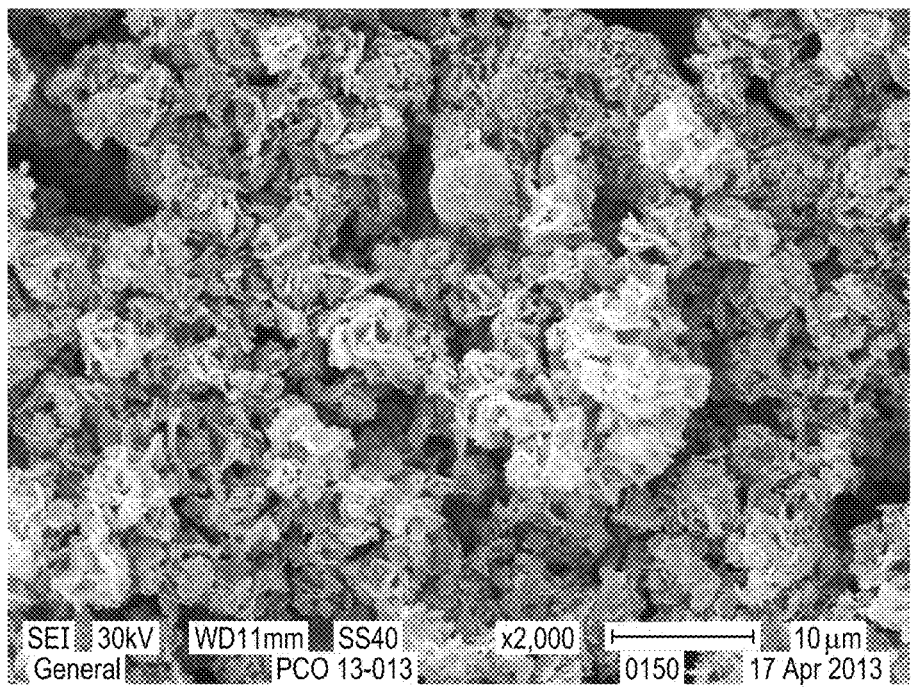

According to X-ray diffraction analysis with additional thermogravimetric analysis the product obtained contained 64±2% $CaCO_3$ (calcite), 32±2% hydromagnesite, the remainder being composed of $Mg(OH)_2$ and $Mg_3O_2(OH)_2$. Its bulk density measured according to standard EN 459.2 was 161 kg/m³. The specific surface area was 17.7 m²/g (BET method based on nitrogen adsorption manometry). Thermal conductivity was 36.4 mW/K/m for a density at the time of measurement of 177 kg/m³. FIG. 6 illustrates the product obtained. This photograph again shows that the crystallization hydromagnesite plates takes place on the surface of the particles of $CaCO_3$ (PCC formed in situ and GCC).

EXAMPLE 5

Carbonation at 60° C. of a Suspension of Dolomite and Ground Calcium Carbonate with Ca/Mg (mol) in the Order of 2.0

This example is fully comparable with Example 4 above but this time with a Ca/Mg ratio in the order of 2.0.

At a first step 4.7 kg of the same dolomitic quicklime used in Example 4 were placed in 19 kg of water heated to 55° C. This suspension was again left under agitation for 30 minutes. After the slaking time of 30 minutes, an additional 20 kg of water and 4.7 kg of ground calcium carbonate (GCC the same as in Example 4) were added and agitation continued for 20 minutes. As previously, the suspension obtained was subjected to 200 μm screening. It was then diluted to a dry extract of 11.4%, 80 dm³ of this suspension were placed in the 100 dm³ reactor.

Carbonatation was again performed at 60° C. with the same flow rates of $CO_2$ and air. The dry extract of the suspension being different from that of the suspension in Example 4, these flow rates corresponded this time to 4.9 dm³/m $CO_2$ and 19.7 dm³/min air per kg of solid contained in the suspension before carbonatation.

Throughout carbonatation, the changes in electrical conductivity of the suspension and in pH were similar to those described in Example 5. The reaction was halted when the electrical conductivity stabilised for 20 minutes at 8.0 mS/cm (±0.2 mS/cm).

After carbonatation the distribution of particle size in suspension was again measured and led to a d50 value of 7.6 μm. The suspension was then filtered, dried and the solid obtained was milled as in the above examples.

Figure 7:
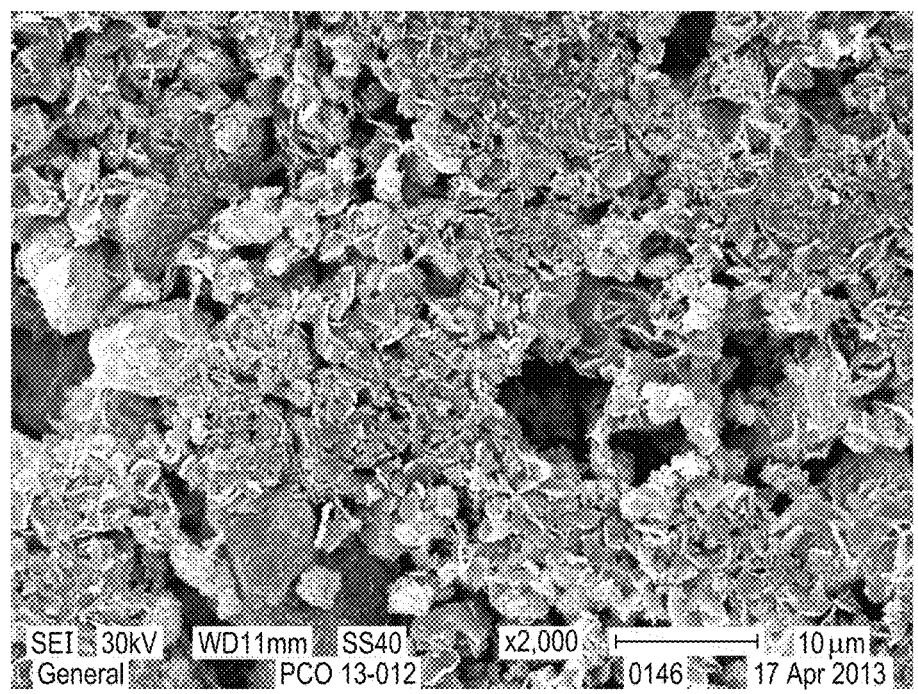
Figure 8:
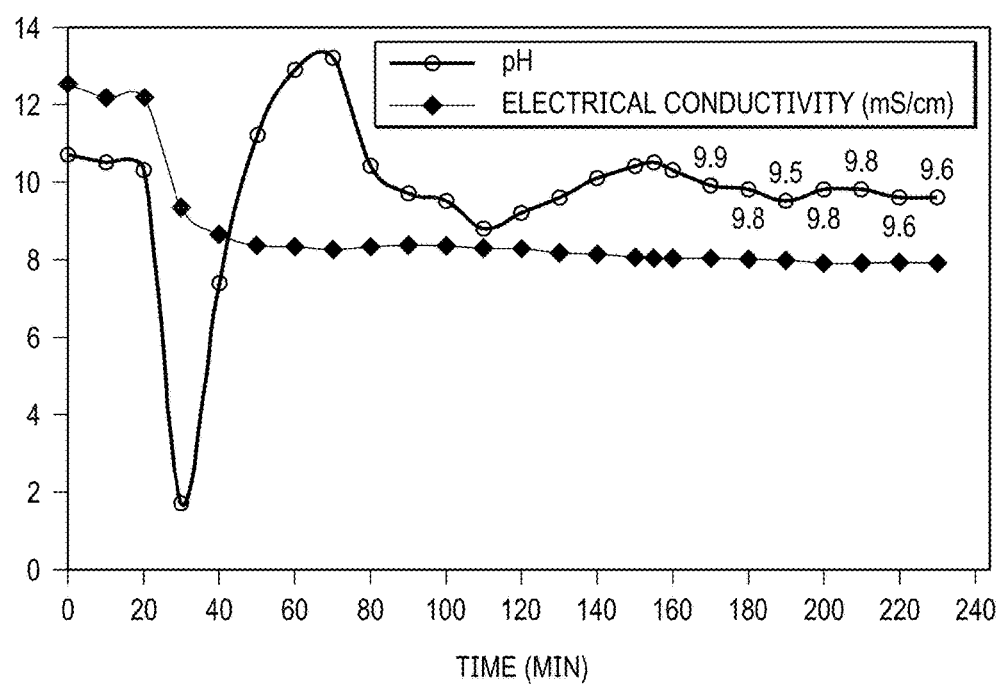

According to X-fay diffraction analysis followed by thermogravimetric analysis, the product obtained contained 71±2% $CaCO_3$ (calcite), 26±2% hydromagnosite, the remainder being composed of $Mg(OH)_2$ and $Mg_3O_2(OH)_2$. Its bulk density measured according to standard EN 459.2 was 247 kg/m³. The specific surface area was 12.6 m²/g (BET method based on nitrogen adsorption manometry). Thermal conductivity was 38.7 mW/K/m for a density at the time of measurement of 244 kg/m³. FIG. 7 illustrates the product obtained.

EXAMPLE 6

Carbonatation at 60° C. of a Suspension Prepared by Slaking a Quicklime with a Suspension of $Mg(OH)_2$ (with Ca/Mg (mol) in the Order of 1.2).

This example was similar to Examples 4 and 5 above in that the conditions of carbonatation of the suspension were identical. On the other hand, the suspension prepared before carbonatation was different.

In this example the suspension to be carbonatated was obtained, as provided by one embodiment of the invention, by preliminary slaking of quicklime (CaO) in a suspension of $Mg(OH)_2$. No ground calcium carbonate (GCC) was used for preparing the suspension. The suspension of $Mg(OH)_2$ was the same as the one used above in Examples 1 to 3. This suspension of $Mg(OH)_2$ was diluted with water to obtain a dry extract of 20.0%. 4.8 kg of quicklime (obtained by calcining a calcium carbonate) were mixed with 20.0 kg of this diluted suspension of $Mg(OH)_2$. This corresponded to 4.8 kg of quicklime CaO, 4.0 kg of $Mg(OH)_2$ and 16.0 kg of water, i.e. a Ca/Mg molar ratio of about 1.2. This mixture was left under agitation for about 30 minutes during which the quicklime was slaked with the water derived from the suspension of $Mg(OH)_2$. On completion of this step, the solid phase in suspension was mostly composed of $Ca(OH)_2$ and $Mg(OH)_2$ with traces of $CaCO_3$ (unfired particles in the quicklime and/or in $Mg(OH)_2$) and of non-slaked CaO and impurities. The suspension was passed through a 200 μm screen then diluted to a dry extract 6.9%. 80 dm³ of this diluted suspension were placed in the 100 dm³ reactor. Carbonatation was again performed at 60° C. with 45 dm³/min $CO_2$ and 180 dm³/min air i.e. 8.2 dm³/min $CO_2$ and 32.6 dm³/air per kg of solid phase in suspension.

As in Examples 4 and 5, throughout carbonatation (FIG. 8) the electrical conductivity of the suspension started by decreasing strongly and this decrease was accompanied by a drop in pH from 12.5 to 9.3. These results were the sign of in situ carbonatation of the calcic portion of the solid phase i.e. of the slaked lime $Ca(OH)_2$ to $CaCO_3$ (PCC). The electrical conductivity then increased rapidly due to dissolution of the magnesium portion ($Mg(OH)_2$ to bicarbonate ions of Mg. After a certain time, the electrical conductivity again decreased, a sign of hydromagnesite precipitation. Finally, the electrical conductivity stabilised and the reaction was halted after 1 hour at 9.7 mS/cm (±0.2 mS/cm). This second phase of the reaction corresponding to the reaction of the magnesium portion was accompanied by a second drop in pH to 7.9.

After carbonatation, the $d_{50}$ of this carbonated suspension was 8.1 μm. The suspension was then filtered, dried and the solid obtained was milled as in the preceding examples.

Figure 9:
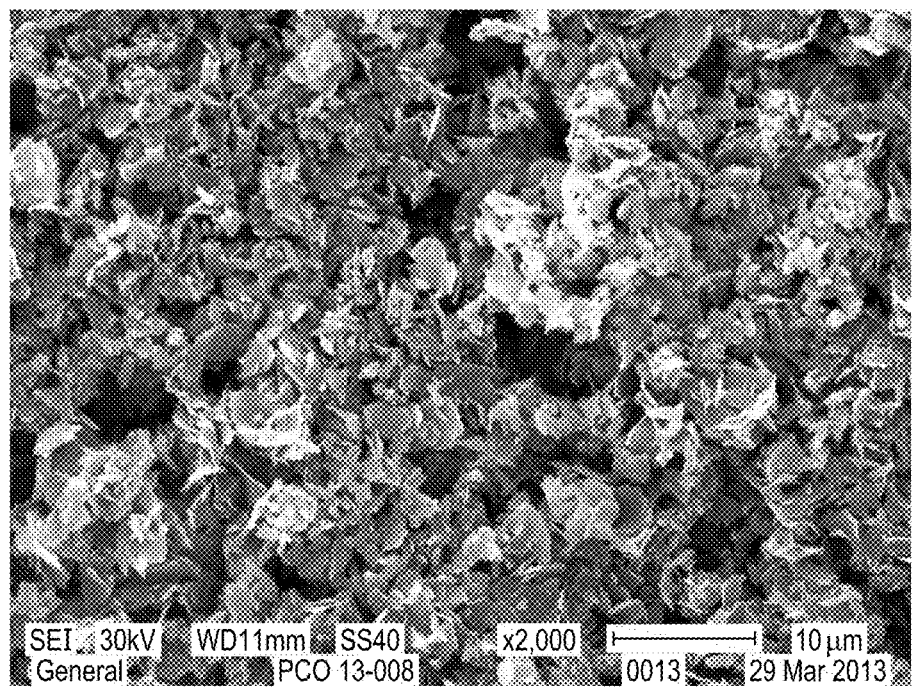

According to X-ray diffraction analysis with additional thermogravimetric analysis, the product obtained contained 51±2% $CaCO_3$ (calcite), 45±2% hydromagnesite, the remainder being composed of $Mg(OH)_2$ and $Mg_3O_2(OH)_2$. Its bulk density measured in accordance with standard EN 459.2 was 152 kg/m³. The specific surface area was 17.0 m²/g. Thermal conductivity was 36.4 mW/K/m for a density at the time of measurement of 154 kg/m³. FIG. 9 is a scanning electron microscope image of the product obtained. This photograph shows well crystallized hydromagnesite plates.

EXAMPLE 7

Carbonatation at 60° C. of a Magnesian Lime with Ca/Mg (mol) in the Order of 2.9

In this example the raw material was a magnesian limestone containing 75.6% $CaCO_2$, 22.1% $MgCO_3$, the remainder being impurities (chiefly $SiO_2$ but also $Al_2O_3$ and $Fe_2O_3$). The molar ratio between Ca and Mg in this case was therefore in the order of 2.9. This limestone (calibre 5-15 mm) was calcined for 2 h at 980° C. in a laboratory electric oven. After calcining, partly calcined magnesian lime was obtained. During calcining, while decarbonatation of $MgCO_3$ to MgO was complete, that of $CaCO_3$ to CaO was only incomplete. The calcined product therefore contained MgO, CaO, $CaCO_3$ and impurities, the $CaCO_3$ content being in the order of 44% after thermogravimetric analysis of the calcined sampled (950° C. at 5° C./min under nitrogen).

About 6.5 kg of this calcined product were placed in 19.5 dm³ water previously heated to 55° C. and the slaking reaction was continued for about 1 hour after agitation (300 rpm). After this slaking reaction, the suspension contained $Mg(OH)_2$ and $Ca(OH)_2$ produced by slaking of MgO and CaO, but also non-slaked magnesium oxide MgO, the $CaCO_3$ derived from incomplete calcining of the starting magnesian limestone and the impurities contained in this source of magnesian limestone. The suspension obtained was passed through a 200 μm screen and diluted to obtain a dry extract (solid content) of 7.6% by weight. 80 cm³ of this suspension were placed in the reactor of 100 dm³ capacity.

Carbonatation was again performed at 60° C. with 45 dm³/min $CO_2$ and 180 dm³/min air, i.e. 7.4 $^{dm3}$/min $CO_2$ and 29.6 dm³/min air per kg of solid phase in suspension.

Figure 10:
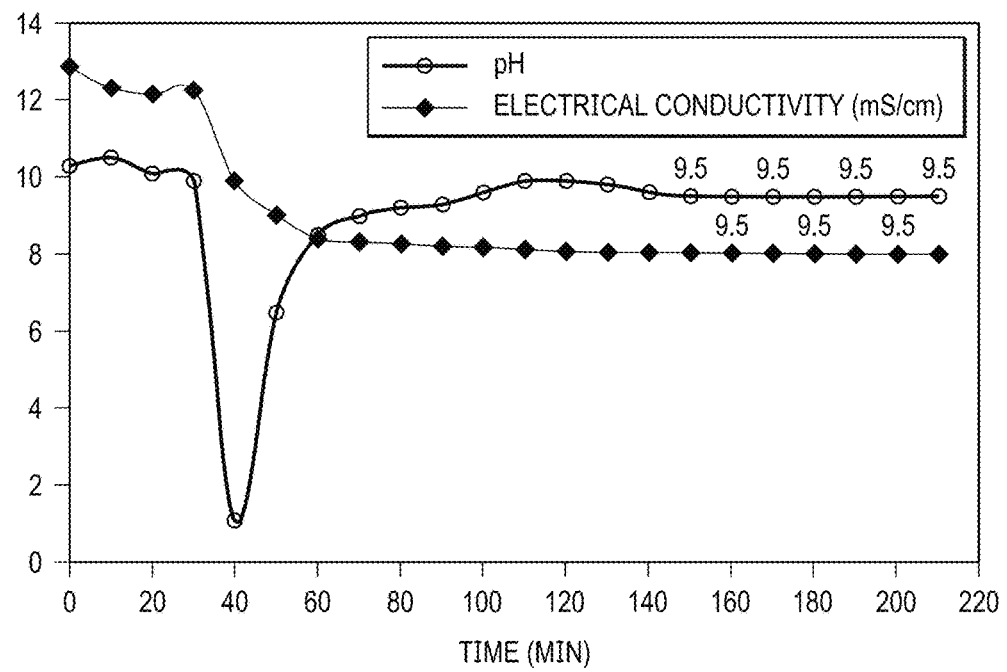

The onset of changes in electrical conductivity of the suspension and in pH occurred in similar manner to Example 6 i.e. with distinct simultaneous decrease in electrical conductivity and drop in pH corresponding to precipitation of calcium carbonate (PCC) from the slaked lime contained in the suspension (FIG. 10). At the end of this first step the pH of the suspension was about 9.5.

Then again in similar manner to Example 6, the conductivity rapidly increased due to production of bicarbonate ions of Mg. While in Example 6 (FIG. 8) the conductivity again decreased before stabilising, here (FIG. 10) no decrease was observed and conductivity gradually stabilised after the increase related to the bicarbonate ions. This difference between this Example 7 and Example 6 is probably related to the reactivity of the Mg sources.

After carbonatation, the $d_{50}$ of this suspension was 7.0 μm. The suspension was then filtered, dried and the solid obtained milled as in the preceding examples.

Figure 11:
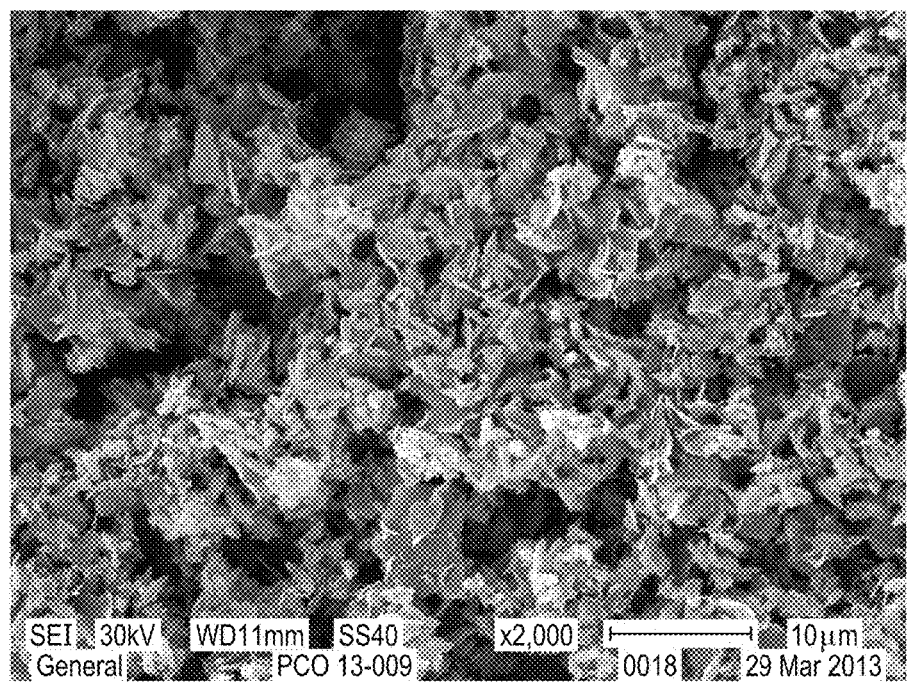

According to X-ray diffraction analysis with additional thermogravimetric analysis the product obtained contained 68±2% $CaCO_3$ (calcite), 28±2% hydromagnesite, the remainder being composed of $Mg(OH)_2$ and $Mg_3O_2(OH)_2$. Its bulk density measured in accordance with standard EN 459.2 was 221 $kg/m^3$. The specific surface area was 17.4 $m^2/g$. Thermal conductivity was 37.4 mW/K/m for a density measured at the time of measurement of 213 $kg/m^3$. FIG. 11 is scanning electron microscope image of the product obtained. This photograph shows well-crystallized hydromagnesite plates.

The invention is evidently in no way limited to these examples and numerous modifications can be made thereto without departing from the scope of the appended claims.

The invention claimed is:

1. A mineral composition containing a mixed solid phase of synthetic calcium and magnesium carbonates, formed of a crystallized calcic portion and a plate-like form crystallized magnesian portion, the crystals of the calcic portion and those of the magnesian portion being aggregated in a form of composite aggregates, these aggregates themselves being at least partly agglomerated in a form of agglomerates, said calcic portion comprising at least one carbonate selected from the group consisting of calcite and the mixtures of calcite and aragonite, said magnesian portion comprising hydromagnesite in the plate-like form, said aggregates being formed of a calcic core on which hydromagnesite plates are aggregated, said mixed solid phase of carbonates of said mineral composition having a thermal conductivity of 25 to 45 mW/Km for a bulk density of 250 $kg/m^3$ or lower and of 80 $kg/m^3$ or higher measured in accordance with standard EN 459.2, and a Ca/Mg molar ratio higher than 1.2 and equal to or less than 4.0.

2. The composition of claim 1, wherein the mixed solid phase has a Ca/Mg molar ratio higher than 1.2 and equal to or less than 3.0.

3. The mineral composition of claim 1, further comprising an aqueous phase, said mineral composition being in a form of a suspension or paste.

4. The mineral composition of claim 1, wherein said mineral composition is in a solid, powder form, and has a humidity level of between 0 and 4% by weight of water relative to the total weight of the composition.

* * * * *